(12) United States Patent
Campbell et al.

(10) Patent No.: US 8,654,099 B2
(45) Date of Patent: Feb. 18, 2014

(54) CONTROL OF DATA PROCESSING BASED ON INTER-IMAGE MOTION DETECTION

(75) Inventors: Diarmid Achibald Campbell, London (GB); Mauritius Seeger, London (GB)

(73) Assignee: Sony Computer Entertainment Europe Limited (GB)

( * ) Notice: Subject to any disclaimer, the term of this patent is extended or adjusted under 35 U.S.C. 154(b) by 1041 days.

(21) Appl. No.: 12/301,745

(22) PCT Filed: May 17, 2007

(86) PCT No.: PCT/GB2007/001810
§ 371 (c)(1),
(2), (4) Date: Mar. 10, 2009

(87) PCT Pub. No.: WO2007/135376
PCT Pub. Date: Nov. 29, 2007

(65) Prior Publication Data
US 2009/0268040 A1    Oct. 29, 2009

(30) Foreign Application Priority Data

May 24, 2006   (GB) .................................. 0610324.6

(51) Int. Cl.
*G06F 3/042*     (2006.01)
*G06K 9/00*      (2006.01)

(52) U.S. Cl.
USPC ......................... 345/175; 178/18.09; 382/107

(58) Field of Classification Search
USPC ................... 345/173–178; 178/18.01–18.11; 715/863; 382/107
See application file for complete search history.

(56) References Cited

U.S. PATENT DOCUMENTS

| 4,240,109 A | 12/1980 | Michael et al. |
| 4,953,032 A | 8/1990 | Suzaki et al. |
| 5,734,933 A | 3/1998 | Sekine et al. |
| 5,764,283 A | 6/1998 | Pingali et al. |

(Continued)

FOREIGN PATENT DOCUMENTS

| EP | 0952552 | 10/1999 |
| EP | 1549048 A3 | 7/2005 |

(Continued)

OTHER PUBLICATIONS

International Search Report dated Nov. 17, 2008 from the corresponding PCT/GB2007/001810.

(Continued)

*Primary Examiner* — Bipin Shalwala
*Assistant Examiner* — Steven Holton
(74) *Attorney, Agent, or Firm* — Lerner, David, Littenberg, Krumholz & Mentlik, LLP

(57) ABSTRACT

A data processing apparatus is arranged to receive successive images from a video camera. The apparatus includes means for detecting inter-image motion for selected points in an image region associated with a control function of the apparatus. The apparatus also includes means for executing the control function if inter-image motion is detected in the image region. The detecting means is configured to select points in an image region of a current image that are validated by selecting test points in a currently received image based upon their correspondence with points in a preceding received image. The points in the preceding received image themselves corresponding with the points originally selected in the currently received image. The detecting means is also configured to deselect points in the current image whose corresponding test points do not substantially coincide therewith.

27 Claims, 10 Drawing Sheets

(56) References Cited

U.S. PATENT DOCUMENTS

| | | | |
|---|---|---|---|
| 6,301,386 B1 | 10/2001 | Zhu et al. | |
| 6,571,024 B1 * | 5/2003 | Sawhney et al. | 382/294 |
| 6,985,172 B1 | 1/2006 | Rigney et al. | |
| 2002/0097247 A1 | 7/2002 | Ohba | |
| 2004/0131275 A1 | 7/2004 | Minkin et al. | |
| 2006/0035710 A1 * | 2/2006 | Festejo et al. | 463/36 |
| 2006/0158524 A1 | 7/2006 | Yang et al. | |
| 2006/0192782 A1 | 8/2006 | Hildreth | |
| 2006/0203098 A1 | 9/2006 | Henninger, III et al. | |
| 2009/0251553 A1 | 10/2009 | Campbell et al. | |

FOREIGN PATENT DOCUMENTS

| | | |
|---|---|---|
| GB | 2398691 | 8/2004 |
| JP | 2-117276 A | 5/1990 |
| JP | 07320035 A | 12/1995 |
| JP | 2000163193 A | 6/2000 |
| JP | 2001307124 | 11/2001 |
| JP | 2001307124 A | 11/2001 |
| JP | 2001307124 A | 11/2001 |
| JP | 2002196855 A | 7/2002 |
| JP | 2005087754 | 4/2005 |
| JP | 2005087754 A | 4/2005 |
| JP | 2005087754 A | 4/2005 |
| JP | 2005122492 A | 5/2005 |
| JP | 2005526318 A | 9/2005 |
| JP | 2006127541 A | 5/2006 |
| WO | 9001706 A | 2/1990 |
| WO | 2004049698 A1 | 6/2004 |
| WO | 2004073814 | 9/2004 |
| WO | 2005006545 A1 | 1/2005 |
| WO | 2006037786 A2 | 4/2006 |

OTHER PUBLICATIONS

Z. Zivkovic: "Optical-flow-driven Gadgets for Gaming User Interface" Proceedings of the 3rd International Conference on Entertainment Computing (LNCS 3166), Sep. 1, 2004,—Sep. 3, 2004 pp. 90-100, XP002469257 pp. 90, 91, pp. 94-96, pp. 97-99. Also mentioned in International Search Report dated Nov. 17, 2008 from PCT/GB2007/001813.

Bruce Lucas et al: "An Interactive Image Registration Technique with an Application to Stereo Vision" Proceedings of the International Joint Conference on Artificial Intelligence, XX, XX, Aug. 24, 1981, pp. 674-679, XP00242741. Also mentioned in International Search Report dated Nov. 17, 2008 from PCT/GB2007/001813.

International Search Report dated Nov. 17, 2008 from PCT/GB2007/001813.

UK Search Report (Combined Search and Examination Report under Sections 17 and 18(3) dated Sep. 1, 2006 from Application No. GB0610324.6.

Office Action from Japanese Application No. 2009-511563, dated Dec. 15, 2011.

Gene H. Golub and Charles F Van Loan "Matrix Computations", third edition (ISBN: 0801854148), 1996, Contents (three sheets), and Chapter 5 pp. 206-223.

UK Examination Report under Section 18(3) dated Jan. 6, 2009 from corresponding GB0610324.6.

International Partial Search Report dated Jun. 3, 2008 from the corresponding PCT/GB2007/001810.

UK Combined Search and Examination Report dated Aug. 31, 2006 from the corresponding GB0610324.6.

UK Search Report dated Jan. 4, 2007 from the corresponding GB0610324.6.

Z. Zivkovic: "Optical-flow-driven Gadgets for Gaming User Interface" Proceedings of the 3rd International Conference on Entertainment Computing (LNCS 3166), Sep. 1, 2004,—Sep. 3, 2004 pp. 90-100, XP002469257 pp. 90, 91, pp. 94-96, pp. 97-99.

Bruce Lucas et al: "An Interactive Image Registration Technique with an Application to Stereo Vision" Proceedings of the International Joint Conference on Artificial Intelligence, XX, XX, Aug. 24, 1981, pp. 674-679, XP002427041.

Japanese Office Action for Application No. 2009-511564 dated Jul. 31, 2012.

Japanese Office Action for Application No. 2009-511563 dated Oct. 23, 2012.

* cited by examiner

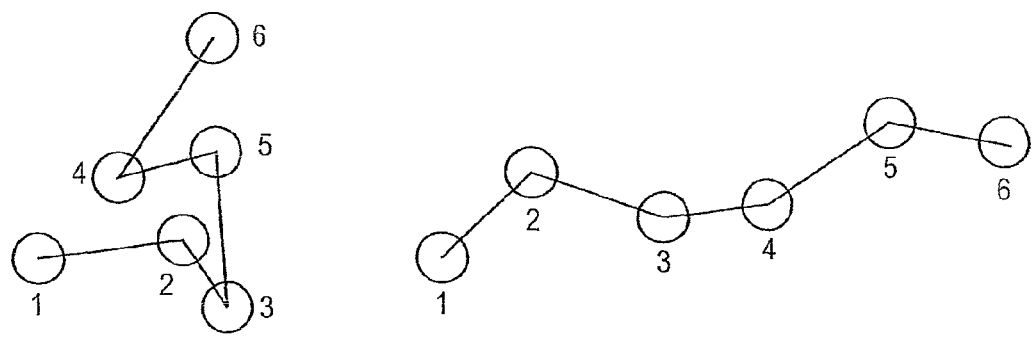
Fig. 10A                    Fig. 10B
Fig. 11

CONTROL OF DATA PROCESSING BASED ON INTER-IMAGE MOTION DETECTION

This invention relates to the control of data processing. A particular example involves the control of video game processing operations, but the invention has more general application to other types of data processing.

In a conventional video games machine, a user views the game on a video monitor or television screen, and controls operation of the game using a hand-held keypad or joystick. With some games machines such as the Sony® PlayStation® 2, a handheld controller provides two joysticks and several user-operated keys, along with a vibrating element to provide tactile feedback to the user of events occurring within the game.

It has been proposed that games machines could make use of video cameras. This can allow an image of the user to appear within the game scenario, or for actions by the user, such as waving a "wand" in the air, to be translated into corresponding actions of a character within a game.

A disadvantage of this arrangement is that the user has to operate the handheld controller to switch between game functions, and generally to control operation of the games machine.

Other previous proposals for control generally involve the user wearing a special glove that has features specifically for detection in a captured image of the gloved hand. A fictional example is shown in the movie "Minority Report".

Various respective aspects and features of the invention are defined in the appended claims. Features from the dependent claims may be combined with features of the independent claims as appropriate and not merely as explicitly set out in the claims.

A first aspect of the present invention provides, data processing apparatus arranged to receive successive images from a video camera; the apparatus comprising:

means for detecting inter-image motion for selected points in an image region associated with a control function of the data processing apparatus; and means for executing the control function if inter-image motion is detected in the image region;

in which the detecting means is arranged to select points in an image region of a current image that are validated by selecting test points in a currently received image based upon their correspondence with points in a preceding received image, the points in the preceding received image themselves corresponding with the points originally selected in the currently received image, and deselect points in the current image whose corresponding test points do not to substantially coincide.

Another aspect of the present invention provides a data processing method comprising the steps of:

receiving successive captured images from a video camera;

detecting inter-image motion for selected points in an image region associated with a control function of the data processing apparatus; and executing the control function if inter-image motion is detected in the image region;

in which the detecting step comprises selecting points in an image region of a current image that are validated by selecting test points in a currently received image based upon their correspondence with points in a preceding received image, the points in the preceding received image themselves corresponding with the points originally selected in the currently received image, and deselecting points in the current image whose corresponding test points do not to substantially coincide.

Another aspect of the present invention provides computer software having program code for carrying out a method as above. The computer software is preferably provided by a providing medium such as a transmission medium or a storage medium.

Further respective aspects and features of the invention are defined in the appended claims. Features of the subclaims may be applied to the various different independent claims even if not explicitly indicated as such.

Embodiments of the invention will now be described, by way of example only, with reference to the accompanying drawings in which:

FIG. 1 schematically illustrates the overall system architecture of the PlayStation2;

FIG. 2 schematically illustrates the architecture of an Emotion Engine;

FIG. 3 schematically illustrates the configuration of a Graphic synthesiser;

FIG. 4 schematically illustrates a dial control;

FIG. 5 schematically illustrates a scrolling control;

FIG. 6 is a block diagram of a user control detection mechanism;

FIGS. 7 to 9 schematically illustrate the comparison of feature points;

FIGS. 10A and 10B illustrate a problem in distinguishing types of motion;

FIG. 11 illustrates a thresholded difference between two images;

Figure 1:
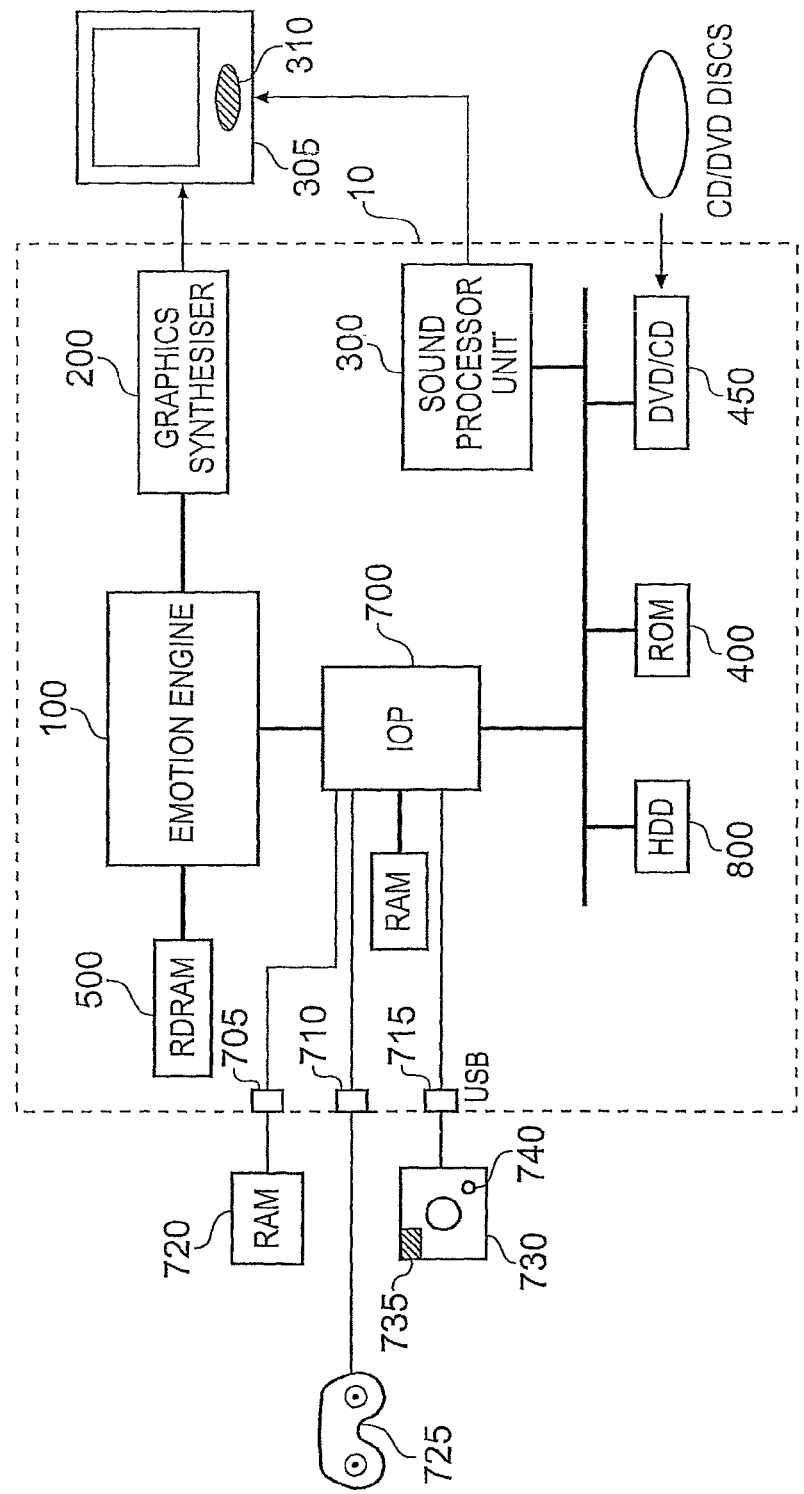

FIG. 1 schematically illustrates the overall system architecture of the PlayStation2. A system unit 10 is provided, with various peripheral devices connectable to the system unit.

The system unit 10 comprises: an Emotion Engine 100; a Graphics Synthesiser 200; a sound processor unit 300 having dynamic random access memory (DRAM); a read only memory (ROM) 400; a compact disc (CD) and digital versatile disc (DVD) reader 450; a Rambus Dynamic Random Access Memory (RDRAM) unit 500; an input/output processor (IOP) 700 with dedicated RAM 750. An (optional) external hard disk drive (HDD) 800 may be connected.

The input/output processor 700 has two Universal Serial Bus (USB) ports 715 and an iLink or IEEE 1394 port (iLink is the Sony Corporation implementation of IEEE 1394 standard). The IOP 700 handles all USB, iLink and game controller data traffic. For example when a user is playing a game, the IOP 700 receives data from the game controller and directs it to the Emotion Engine 100 which updates the current state of the game accordingly. The IOP 700 has a Direct Memory Access (DMA) architecture to facilitate rapid data transfer rates. DMA involves transfer of data from main memory to a device without passing it through the CPU. The USB interface is compatible with Open Host Controller Interface (OHCI) and can handle data transfer rates of between 1.5 Mbps and 12 Mbps. Provision of these interfaces mean that the PlayStation2 is potentially compatible with peripheral devices such as video cassette recorders (VCRs), digital cameras, set-top boxes, printers, keyboard, mouse and joystick.

Generally, in order for successful data communication to occur with a peripheral device connected to a USB port 715, an appropriate piece of software such as a device driver should be provided. Device driver technology is very well known and will not be described in detail here, except to say that the skilled man will be aware that a device driver or similar software interface may be required in the embodiment described here.

In the present embodiment, a video camera 730 with an associated microphone 735 and an LED indicator 740 is connected to the USB port. Although various types of video camera may be used, a particularly suitable type of video camera 735 is a so-called "webcam", that is, a medium-resolution camera based on a single charge-coupled device (CCD) element and including a basic hardware-based real-time data compression and encoding arrangement, so that compressed video and audio data are transmitted by the camera 730 to the USB port 715 in an appropriate format, such as an intra-image based MPEG (Motion Picture Expert Group) standard, for decoding at the PlayStation2 system unit 10. The camera LED indicator 740 is arranged to receive control data via the USB data connection to the system unit 10 and to illuminate in response to such control data.

Apart from the USB ports, two other ports 705, 710 are proprietary sockets allowing the connection of a proprietary non-volatile RAM memory card 720 for storing game-related information, a hand-held game controller 725 or a device (not shown) mimicking a hand-held controller, such as a dance mat.

The Emotion Engine 100 is a 128-bit Central Processing Unit (CPU) that has been specifically designed for efficient simulation of 3 dimensional (3D) graphics for games applications. The Emotion Engine components include a data bus, cache memory and registers, all of which are 128-bit. This facilitates fast processing of large volumes of multi-media data. Conventional PCs, by way of comparison, have a basic 64-bit data structure. The floating point calculation performance of the PlayStation2 is 6.2 GFLOPs. The Emotion Engine also comprises MPEG2 decoder circuitry which allows for simultaneous processing of 3D graphics data and DVD data. The Emotion Engine performs geometrical calculations including mathematical transforms and translations and also performs calculations associated with the physics of simulation objects, for example, calculation of friction between two objects. It produces sequences of image rendering commands which are subsequently utilised by the Graphics Synthesiser 200. The image rendering commands are output in the form of display lists. A display list is a sequence of drawing commands that specifies to the Graphics Synthesiser which primitive graphic objects (e.g. points, lines, triangles, sprites) to draw on the screen and at which co-ordinates. Thus a typical display list will comprise commands to draw vertices, commands to shade the faces of polygons, render bitmaps and so on. The Emotion Engine 100 can asynchronously generate multiple display lists.

The Graphics Synthesiser 200 is a video accelerator that performs rendering of the display lists produced by the Emotion Engine 100. The Graphics Synthesiser 200 includes a graphics interface unit (GIF) which handles, tracks and manages the multiple display lists. The rendering function of the Graphics Synthesiser 200 can generate image data that supports several alternative standard output image formats, i.e., NTSC/PAL, High Definition Digital TV and VESA. In general, the rendering capability of graphics systems is defined by the memory bandwidth between a pixel engine and a video memory, each of which is located within the graphics processor. Conventional graphics systems use external Video Random Access Memory (VRAM) connected to the pixel logic via an off-chip bus which tends to restrict available bandwidth. However, the Graphics Synthesiser 200 of the PlayStation2 provides the pixel logic and the video memory on a single high-performance chip which allows for a comparatively large 38.4 Gigabyte per second memory access bandwidth. The Graphics Synthesiser is theoretically capable of achieving a peak drawing capacity of 75 million polygons per second. Even with a full range of effects such as textures, lighting and transparency, a sustained rate of 20 million polygons per second can be drawn continuously. Accordingly, the Graphics Synthesiser 200 is capable of rendering a film-quality image.

The Sound Processor Unit (SPU) 300 is effectively the soundcard of the system which is capable of recognising 3D digital sound such as Digital Theater Surround (DTS®) sound and AC-3 (also known as Dolby Digital) which is the sound format used for digital versatile disks (DVDs).

A display and sound output device 305, such as a video monitor or television set with an associated loudspeaker arrangement 310, is connected to receive video and audio signals from the graphics synthesiser 200 and the sound processing unit 300.

The main memory supporting the Emotion Engine 100 is the RDRAM (Rambus Dynamic Random Access Memory) module 500 produced by Rambus Incorporated. This RDRAM memory subsystem comprises RAM, a RAM controller and a bus connecting the RAM to the Emotion Engine 100.

Figure 2:
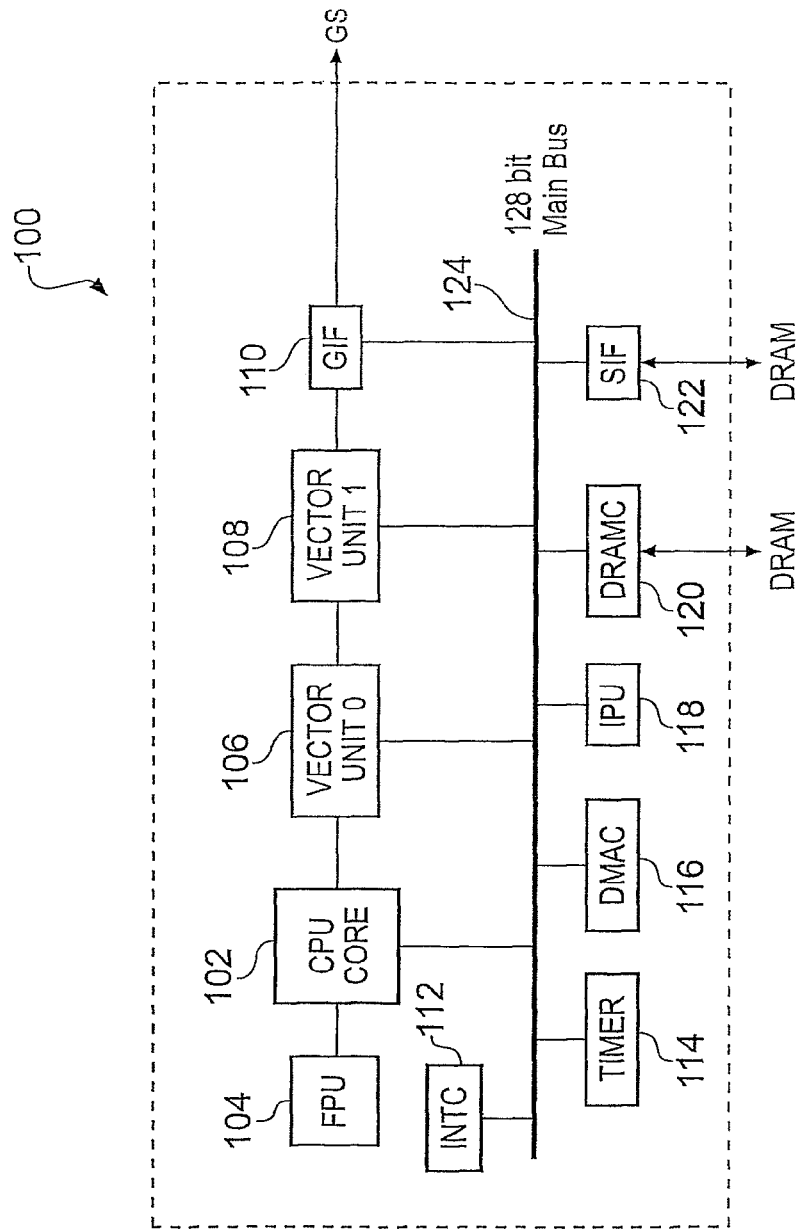

FIG. 2 schematically illustrates the architecture of the Emotion Engine 100 of FIG. 1. The Emotion Engine 100 comprises: a floating point unit (FPU) 104; a central processing unit (CPU) core 102; vector unit zero (VU0) 106; vector unit one (VU1) 108; a graphics interface unit (GIF) 110; an interrupt controller (INTC) 112; a timer unit 114; a direct memory access controller 116; an image data processor unit (IPU) 116; a dynamic random access memory controller (DRAMSC) 120; a sub-bus interface (SIF) 122; and all of these components are connected via a 128-bit main bus 124.

The CPU core 102 is a 128-bit processor clocked at 300 MHz. The CPU core has access to 32 MB of main memory via the DRAMC 120. The CPU core 102 instruction set is based on MIPS III RISC with some MIPS IV RISC instructions together with additional multimedia instructions. MIPS III and IV are Reduced Instruction Set Computer (RISC) instruction set architectures proprietary to MIPS Technologies, Inc. Standard instructions are 64-bit, two-way superscalar, which means that two instructions can be executed simultaneously. Multimedia instructions, on the other hand, use 128-bit instructions via two pipelines. The CPU core 102 comprises a 16 KB instruction cache, an 8 KB data cache and a 16 KB scratchpad RAM which is a portion of cache reserved for direct private usage by the CPU.

The FPU 104 serves as a first co-processor for the CPU core 102. The vector unit 106 acts as a second co-processor. The FPU 104 comprises a floating point product sum arithmetic logic unit (FMAC) and a floating point division calculator (FDIV). Both the FMAC and FDIV operate on 32-bit values so when an operation is carried out on a 128-bit value (composed of four 32-bit values) an operation can be carried out on all four parts concurrently.

The vector units 106 and 108 perform mathematical operations and are essentially specialised FPUs that are extremely fast at evaluating the multiplication and addition of vector equations. They use Floating-Point Multiply-Adder Calculators (FMACs) for addition and multiplication operations and Floating-Point Dividers (FDIVs) for division and square root operations. They have built-in memory for storing microprograms and interface with the rest of the system via Vector Interface Units (VIFs). Vector Unit Zero 106 can work as a coprocessor to the CPU core 102 via a dedicated 128-bit bus 124 so it is essentially a second specialised FPU. Vector Unit One 108, on the other hand, has a dedicated bus to the Graphics synthesiser 200 and thus can be considered as a completely separate processor. The inclusion of two vector units allows the software developer to split up the work between different parts of the CPU and the vector units can be used in either serial or parallel connection.

Vector unit zero 106 comprises 4 FMACS and 1 FDIV. It is connected to the CPU core 102 via a coprocessor connection. It has 4 Kb of vector unit memory for data and 4 Kb of micro-memory for instructions. Vector unit zero 106 is useful for performing physics calculations associated with the images for display. It primarily executes non-patterned geometric processing together with the CPU core 102.

Vector unit one 108 comprises 5 FMACS and 2 FDIVs. It has no direct path to the CPU core 102, although it does have a direct path to the GIF unit 110. It has 16 Kb of vector unit memory for data and 16 Kb of micro-memory for instructions. Vector unit one 108 is useful for performing transformations. It primarily executes patterned geometric processing and directly outputs a generated display list to the GIF 110.

The GIF 110 is an interface unit to the Graphics Synthesiser 200. It converts data according to a tag specification at the beginning of a display list packet and transfers drawing commands to the Graphics Synthesiser 200 whilst mutually arbitrating multiple transfer. The interrupt controller (INTC) 112 serves to arbitrate interrupts from peripheral devices, except the DMAC 116.

The timer unit 114 comprises four independent timers with 16-bit counters. The timers are driven either by the bus clock (at 1/16 or 1/256 intervals) or via an external clock. The DMAC 116 handles data transfers between main memory and peripheral processors or main memory and the scratch pad memory. It arbitrates the main bus 124 at the same time. Performance optimisation of the DMAC 116 is a key way by which to improve Emotion Engine performance. The image processing unit (IPU) 118 is an image data processor that is used to expand compressed animations and texture images. It performs I-PICTURE Macro-Block decoding, colour space conversion and vector quantisation. Finally, the sub-bus interface (SIF) 122 is an interface unit to the IOP 700. It has its own memory and bus to control I/O devices such as sound chips and storage devices.

Figure 3:
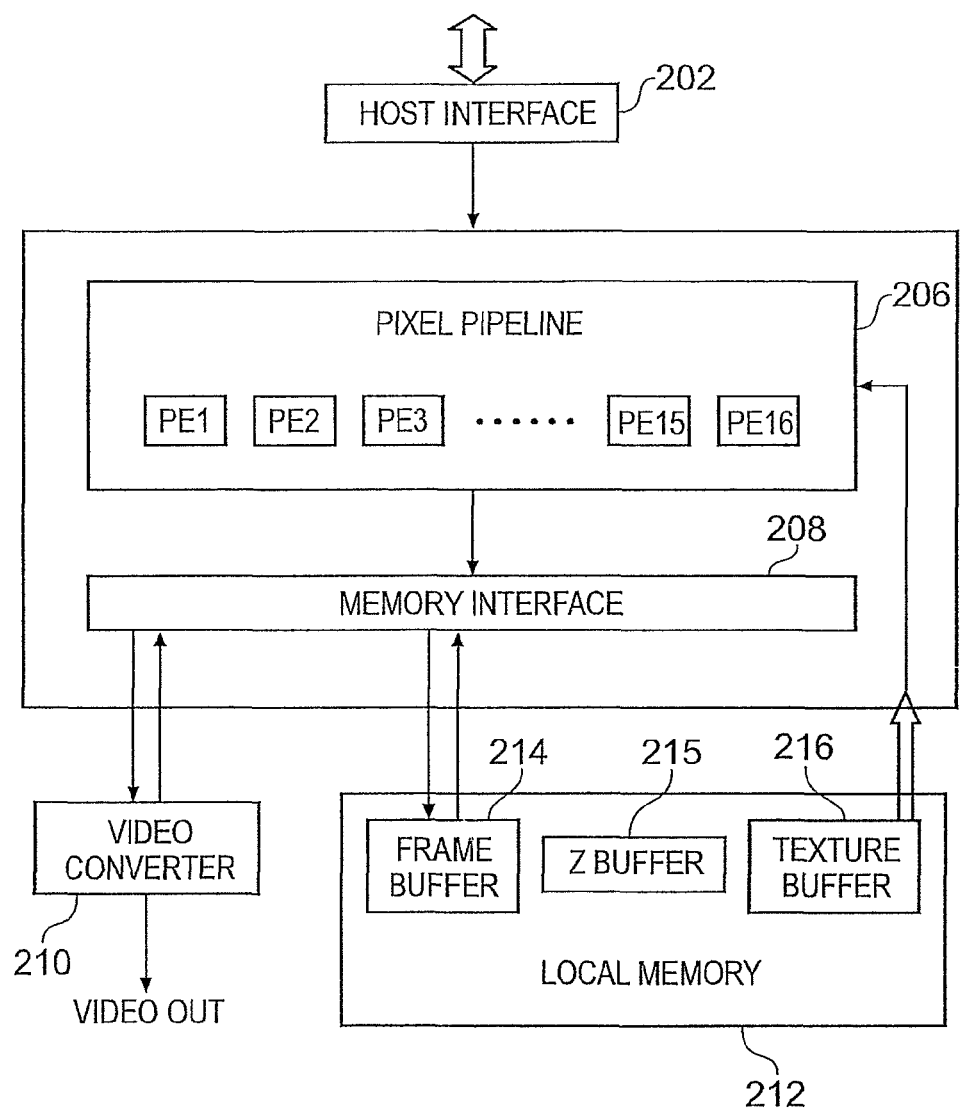

FIG. 3 schematically illustrates the configuration of the Graphic Synthesiser 200. The Graphics Synthesiser comprises: a host interface 202; a set-up/rasterizing unit 204; a pixel pipeline 206; a memory interface 208; a local memory 212 including a frame page buffer 214 and a texture page buffer 216; and a video converter 210.

The host interface 202 transfers data with the host (in this case the CPU core 102 of the Emotion Engine 100). Both drawing data and buffer data from the host pass through this interface. The output from the host interface 202 is supplied to the graphics synthesiser 200 which develops the graphics to draw pixels based on vertex information received from the Emotion Engine 100, and calculates information such as RGBA value, depth value (i.e. Z-value), texture value and fog value for each pixel. The RGBA value specifies the red, green, blue (RGB) colour components and the A (Alpha) component represents opacity of an image object. The Alpha value can range from completely transparent to totally opaque. The pixel data is supplied to the pixel pipeline 206 which performs processes such as texture mapping, fogging and Alpha-blending (as explained below) and determines the final drawing colour based on the calculated pixel information.

The pixel pipeline 206 comprises 16 pixel engines PE1, PE2 . . . PE16 so that it can process a maximum of 16 pixels concurrently. The pixel pipeline 206 runs at 150 MHz with 32-bit colour and a 32-bit Z-buffer. The memory interface 208 reads data from and writes data to the local Graphics Synthesiser memory 212. It writes the drawing pixel values (RGBA and Z) to memory at the end of a pixel operation and reads the pixel values of the frame buffer 214 from memory. These pixel values read from the frame buffer 214 are used for pixel test or Alpha-blending. The memory interface 208 also reads from local memory 212 the RGBA values for the current contents of the frame buffer. The local memory 212 is a 32 Mbit (4 MB) memory that is built-in to the Graphics Synthesiser 200. It can be organised as a frame buffer 214, texture buffer 216 and a 32-bit Z-buffer 215. The frame buffer 214 is the portion of video memory where pixel data such as colour information is stored.

The Graphics Synthesiser uses a 2D to 3D texture mapping process to add visual detail to 3D geometry. Each texture may be wrapped around a 3D image object and is stretched and skewed to give a 3D graphical effect. The texture buffer is used to store the texture information for image objects. The Z-buffer 215 (also known as depth buffer) is the memory available to store the depth information for a pixel. Images are constructed from basic building blocks known as graphics primitives or polygons. When a polygon is rendered with Z-buffering, the depth value of each of its pixels is compared with the corresponding value stored in the Z-buffer. If the value stored in the Z-buffer is greater than or equal to the depth of the new pixel value then this pixel is determined visible so that it should be rendered and the Z-buffer will be updated with the new pixel depth. If however the Z-buffer depth value is less than the new pixel depth value the new pixel value is behind what has already been drawn and will not be rendered.

The local memory 212 has a 1024-bit read port and a 1024-bit write port for accessing the frame buffer and Z-buffer and a 512-bit port for texture reading. The video converter 210 is operable to display the contents of the frame memory in a specified output format.

Figure 4:
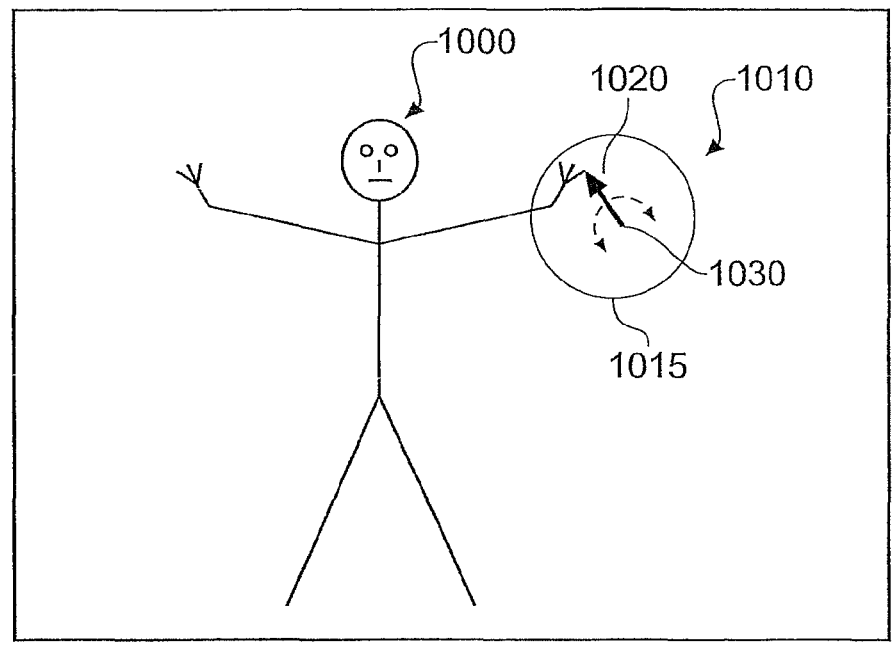
Figure 5:
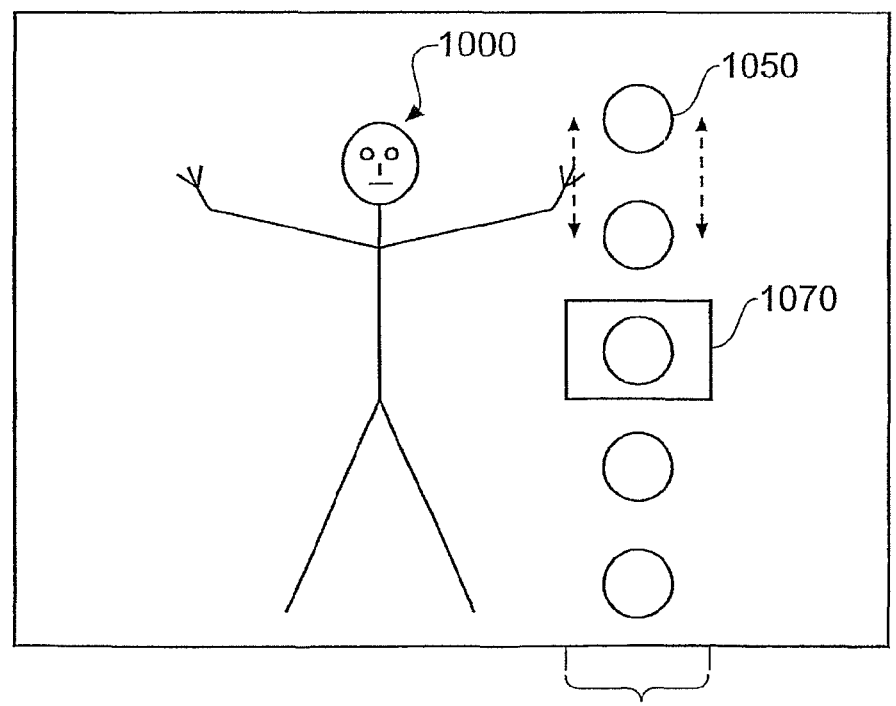

In FIGS. 4 and 5, several different user interface (UI) controls are described.

FIG. 4 schematically illustrates a dial control.

The rectangular outline on FIG. 4 schematically represents the outer edge of an image captured by the camera 730 and displayed on the display 305. In operation, successive images or frames captured by the camera 730 are passed by the emotion engine 100 to the graphics synthesizer 200 for display as a background to all or a part of the video output of the graphics synthesizer.

In the present example, the camera 730 is directed towards a user 1000.

A dial control 1010 is superposed (by the graphics synthesizer) on the background captured image. The dial control comprises a circular border 1015 within which a pointer 1020 is displayed. The pointer may be associated with a game or machine variable, so that (for example) moving the pointer clockwise increases the variable, whereas moving the pointer anti-clockwise decreases the variable. In this way, the dial control can simulate the operation of a mechanical rotary control such as a potentiometer. The possible motion of the pointer is illustrated by dotted lines. The way in which the user can move the pointer will be described below.

To operate the dial control, the user positions his hand at least partially within the border 1015. Then, the motion of the user's hand is detected with respect to the axis (centre of rotation) 1030 of the pointer 1020. The way in which the motion is detected will be described below, but the effect of such detection is that if the overall motion of the user's hand within the border 1015 is detected to be in a clockwise direction with respect to the centre 1030, the pointer is moved correspondingly clockwise (and the game or machine variable is increased). If the overall motion of the user's hand within the border 1015 is detected to be in an anti-clockwise direction with respect to the centre 1030, the pointer is moved correspondingly anti-clockwise (and the game or machine variable is decreased). The movement or rotation of the pointer can be arranged to be the same as or proportional to the hand movement. Virtual "end stops" may be provided, so that continued hand motion in a certain direction does not lead to continued rotation of the pointer, but rather the pointer stops rotating when it reaches one of the end stops.

Optionally, the dial can be locked (inhibited from moving) unless appropriate motion is detected within the circular border 1015, thus preventing incidental adjustment. The dial can denote its locking status by changing colour.

The game or machine variable can be altered straight away, or the alteration can be deferred until the user stops rotating the pointer or withdraws his hand from within the border 1015. The mechanism facilitating the dial control is described later.

FIG. 5 schematically illustrates a scrolling control.

In a similar way to FIG. 4, scrolling icons 1050 are superposed on a captured image from the camera 730 of the user 1000. In the present example, the scrolling icons are arranged to scroll vertically, but of course they could scroll in any appropriate direction (or indeed more than one direction, in for example the case of an array of scrolling icons). The icons can extend beyond those currently visible at any time. Preferably they are arranged in an endless carousel format, but they can be arranged as a simple line formation.

The basic idea is that the user can scroll the icons up and down by a generally vertical hand motion (or by a vertical component of a non-vertical hand motion). As before, the scrolling motion of the icons can be equal to the vertical motion of the user's hand or can be otherwise proportional to or dependent upon such motion. The vertical motion may be detected within a region 1060 of the image surrounding the icons.

The detection region 1060 allows another alternative, in which the user can initiate a vertical scrolling motion of the icons in a particular direction, and keep his hand moving vertically as he withdraws the hand from the region 1060. The icons can continue to scroll vertically, either endlessly or in a decaying (slowing down) manner. The user can stop (or reverse or reinforce) this continued motion by re-introducing his hand into the region 1060, either stationary or moving.

A selection box 1070 is shown. This is typically stationary in the display and allows one of the icons to be selected, by moving the icons up or down until the desired icon lies within the selection box. So, if the icons represent (for example) game options or music tracks, the act of the user positioning an icon within the box 1070 can cause that game option to be implemented or that music track to be replayed.

The mechanism facilitating the scrolling control is described later.

Referring again to FIG. 4, a variant of the dial control is a wheel control. The wheel control operates in a similar manner to the dial control, but movement of the wheel is similar to that of the scroll control, in that the user can spin the wheel by initiating movement within the area bounded by the wheel border 1015, and then keeping his hand moving as he withdraws it from the wheel border 1015. If the motion of the hand is consistent during this action, the wheel will continue to spin as if with its own momentum, either endlessly or in a decaying (slowing down) manner. The user can stop (or reverse or reinforce) this continued motion by re-introducing his hand into the region bounded by wheel border 1015, either stationary or moving as applicable.

The wheel control may be used for example to select options illustrated on the wheel as a circular form of the vertical scroll items, or to denote the level of energy a game character uses to perform an action.

Optionally, the wheel can be always unlocked, allowing any detected motion within the wheel border 1015 to potentially induce spin.

The mechanism facilitating the wheel control is described later.

Figure 6:
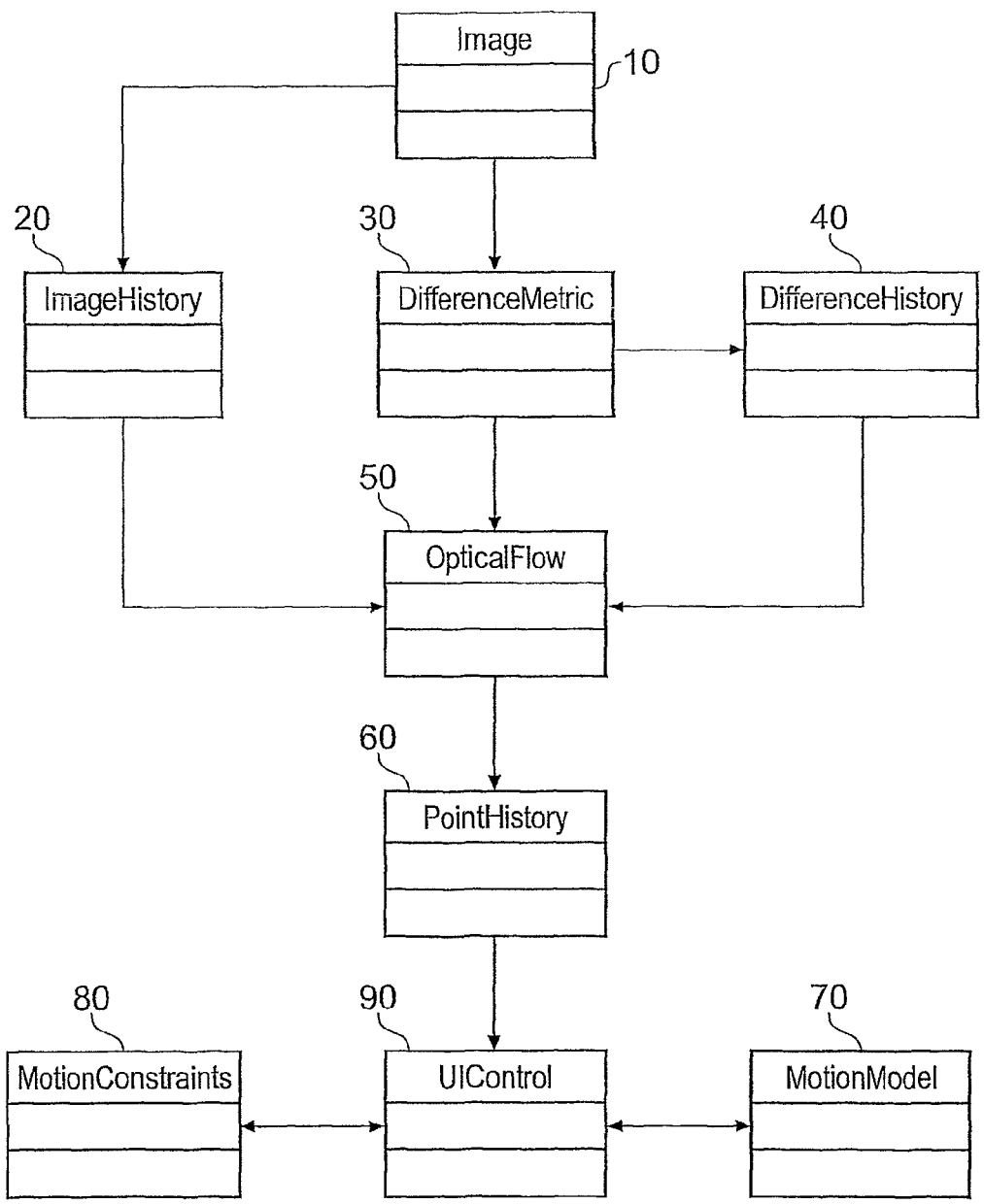

FIG. 6 is a block diagram illustrating a user control detection mechanism, executed by the emotion engine 100 operating under software instruction. For simplicity, the diagram illustrates object classes for an object-oriented program, in which a class comprises data and functions operable upon that data. For example, an Image class 10 may contain information such as width, height, number of colour channels and the colour of each pixel in the image. It may also have a number of functions which can act on this data. For example GetNumPixels( ), GetPixelColour(int x, int y) and SetPixelColour(int x, int y, Colour RGB), which respectively evaluate the size of an image, obtain the colour value of a pixel at a given co-ordinate, and set the colour value of a pixel at a given co-ordinate.

Consequently in the following discussion it will be understood that when a class is referred to as having certain properties or information, it refers to the data within the class, whilst when the class is referred to as acting upon such information, it relates to a function within the class.

In FIG. 6, in summary the video camera 730, attached to a data processing apparatus such as the emotion engine 100, produces images (i.e. data belonging to the Image class 10). An ImageHistory class 20 stores the last J images. A DifferenceMetric class 30 holds the current and preceding images and processes them to create images showing where sequential images differ, and by how much. These difference images are thresholded and stored in a DifferenceHistory class 40. Functions in an OpticalFlow class 50 analyse images in the ImageHistory class 20 and find valid recognisable points to track from one image to the next. Optionally, functions in the OpticalFlow class 50 can use the DifferenceHistory class 40 to verify and speed up this process. A PointHistory class 60 stores the list of points which have been identified by the OpticalFlow class 50 functions and where they are located in each image in the ImageHistory class 20.

Next, a MotionModel class 70 models motion corresponding to changes in position between pairs of these points. It takes a list of before-and-after positions of moving points for the current and preceding image and creates a translation, scale and rotation model from them as applicable. Optionally, a MotionConstraint class 80 takes the calculated motion/position of an object and restricts it (for example, discarding translation) according to the desired behaviour of the user interface (UI) control.

A UserInterfaceControl (UIControl) class 90 takes the positions in the PointHistory class 60, feeds them to the MotionModel class 70 and then takes the resultant motion and typically applies one or more constraints from MotionConstraints class 80.

This constrained motion then describes the individual UI controls' behaviour.

Details of these classes for an embodiment of the present invention are now given.

The Image class (10) holds the size (width and height) of an image, the number of brightness values possible per colour channel and number of colour channels. The size of the images often depend on the resolution of the camera (e.g. 320×240 or 640×480). However, if controls are only placed in a small region of the screen, optionally this small region may be treated as the image, with the remainder of the source image discarded.

The three main types of image typically used are:
  i. Colour image (3 colour channels, 256 brightness values for each channel)
  ii. Greyscale image (1 colour channel with 256 brightness values)
  iii. Binary image (1 colour channel with 2 brightness values—black and white)

The video camera 730 produces colour images at some fixed frame-rate (e.g. 30, 60 or 120 frames per second). These are converted to Greyscale images before being passed to the ImageHistory 20.

The ImageHistory class 20 stores the last J greyscale images captured from the camera as described above. Each time a new image is added, the oldest one drops off the end of the store. For example, J might be from 3 to 14 or more.

The DifferenceMetric class 30 provides a function for calculating the difference between the two images and then thresholding it. This function takes two colour images (e.g. the current and previous images) as inputs. For each pixel, the difference in each of the colour channels is summed and the resulting values generate a greyscale image. This image is then smoothed using a three point Gaussian blur convolution filter to provide a degree of tolerance. Finally, it is thresholded to create a binary image showing which parts of the image have changed by a sufficient amount. How this difference threshold value is chosen is disclosed later in relation to noise calibration.

Thus the DifferenceMetric class 30 is operable to generate difference data, comprising a set of values proportional to the difference in pixel values between two successive images, and is operable to subsequently smooth the difference data.

Additionally, the DifferenceMetric class 30 is thus also operable to apply a threshold to the difference data at a calculated difference threshold level, and output resulting binary difference data.

The DifferenceHistory class 40 provides a sequence of N−1 binary images. Each holds the difference between two sequential images in the ImageHistory as obtained from the DifferenceMetric class 30. As with the ImageHistory class 20, each time a new image is added, the oldest one stored is discarded.

Additionally, it also holds a "cumulative difference image". This is a binary image with a white pixel if any of the individual images in the DifferenceHistory has a white pixel. Thus it can be thought of as an 'OR' function of the individual images in the DifferenceHistory class 40. Of course, the representation as "black" and "white" is purely for clarity of the present description. In practice the data may be stored as one bit per pixel position, or in another format depending on efficiencies within the storage system. The purpose is to map detected motion against pixel position.

For example, in an otherwise static scene, if a person waved their hand in greeting, the cumulative difference image would generally resemble a circular segment with its origin at the person's elbow that subtends an arc corresponding to the extent of the wave.

Thus the DifferenceHistory class 40 is operable to combine the binary difference data for a sequence of images to generate a cumulative binary difference image indicating all points over a sequence of images that have shown a difference between successive images that have exceeded a calculated difference threshold.

The OpticalFlow class 50 finds points in the latest image to act as feature points, and tracks them back through three or more images in the ImageHistory class 20.

In an embodiment of the present invention, point tracking is based on the Lucas-Kanade point tracker developed in 1981, and published in Lucas, B., and Kanade, T., 'An Iterative Image Registration Technique with an Application to Stereo Vision', Proc. of 7th International Joint Conference on Artificial Intelligence (IJCAI), pp. 674-679.

Given two images, a current and a previous image, the Lucas-Kanade tracker does the following:
  1. Locates a set of positions on the current image which are easily recognisable by analysing Eigenvalues associated with each pixel in the image
  2. Finds the closest match to these points in the previous image
  3. When done, output a set of position pairs showing the previous and current position of identifiable points on the image.

Thus the OpticalFlow class 50 is operable to select points in a preceding image based upon correspondence with selected points in a current image.

Example points are those representing extremities of a shape within the image, or points representing a concave apex of such a shape. In the case of a hand, feature points might be identified at the tips of the fingers and at the apex between adjacent fingers.

Figure 7:
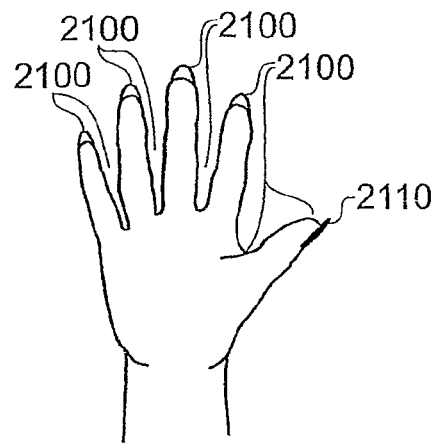
Figure 8:
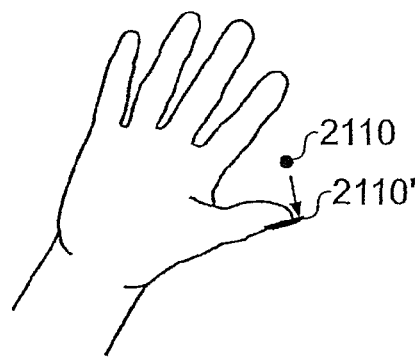
Figure 9:
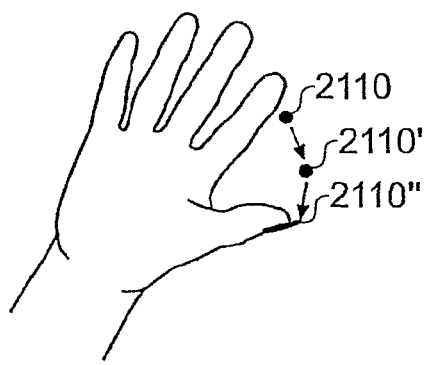

FIGS. 7 to 9 schematically illustrate feature point detection in the Lucas-Kanade point tracker.

Assume that FIG. 7 illustrates a captured image of a user's hand within a control image region. So, the extent of FIG. 7 may be just a portion of an overall captured image, that portion lying within (for example) the border 1015 or the region 1060.

Feature points 2100 are detected as described above. For clarity of the following description, only one feature point, a point 2110 on the tip of the user's thumb, will be considered, but the same description can apply to all of the detected feature points.

By sequential use of the Lucas-Kanade tracking process, the feature point 2110 is correlated with corresponding feature points 2110' and 2110" in FIGS. 8 and 9 respectively. This gives an indication of the motion of the hand, shown schematically in FIGS. 8 and 9 by the previous thumb positions being shown.

However, the Lucas-Kanade tracker is susceptible to a number of problems. In particular, self-similarities in the image (such as tiling or plants) can cause unrelated points to appear correlated between images, generating spurious apparent motion. In addition, there is no distinction made between apparent point motion due to image noise, and real (but small or slow) motion. This distinction becomes particularly acute if it is desirable to implement fine-scale UI control. These problems are detailed below.

Problem 1: For example, along a line of wall, ceiling or floor tiles, the junctions between the tiles all look very similar. Slight noise or shaking in the camera image from one frame to the next can cause one junction to look more like another junction elsewhere on the line in the next image. Consequently, image noise can cause the point match in step 2 of the Lucas-Kanade tracker to associate different tile junctions between frames, causing apparent motion. A similar problem can arise in any repeated pattern such as in wallpaper or a striped T-shirt.

Problem 2: In a likewise fashion to problem 1, self-similar objects such as plants, whilst not as exactly similar as tiles or repeated patterns in print, are sufficiently similar to cause a problem in the following example scenario. A user is standing in front of a pot-plant with their hand raised, obscuring the top of the plant but revealing the lower branches. Points in the image corresponding for example to fingertips and leaf fronds are identified. The user then lowers their hand, obscuring the lower branches of the plant and revealing those at the top. The Lucas-Kanade tracker will track the points in the hand as going downwards, but in the absence of the original points identified in the lower half of the plant, is likely to find similar points in the revealed upper half of the plant and interpret this as upwards movement, effectively negating the perceived motion of the user.

Problem 3: Referring now also to FIGS. 10A&B, these Figures show an example of how a point may appear to move over six sequential frames. FIG. 10A shows a point that is stationary in the scene, but appears to move due to noise in the camera images. It has not moved far, maybe just one or two pixels. FIG. 10B shows a point which is moving in a straight line. In this case, the noise makes it appear as if it is deviating a little from this path. From these Figures it is clear that simply a threshold upon the distance that a point has moved between two frames is insufficient to determine whether the point is genuinely stationary or not. Between two sequential frames, a stationary point can appear to move distances which are comparable to bow a moving point would appear. As the real motion of the point slows down or the frame-rate of the camera increases, this problem is exacerbated.

In light of all these problems, in an embodiment of the present invention a series of improvements to the Lucas-Kanade tracker are incorporated within the Optical Flow class 50.

Firstly, reverse matching is a technique for cutting down on the erroneous matches described in problems 1 and 2 for self-similar lines and the revealing of points over self-similar objects. Suppose that the tracker has found a good point to track in the current frame and located its position in the previous frame. This position can be verified by taking this point in the previous frame as if it were a good feature to track and attempting to locate it in the current frame (i.e. track in reverse time). If the tracking algorithm finds the point in the current frame within (for example) a pixel or other threshold distance of where it expected it to be, it is counted as a valid point-pair. Otherwise it is discarded.

This technique therefore exploits the fact that tracking errors due to self-similarity between image frames (especially when variation is introduced through to image noise) are unlikely to be reciprocal between image frames, and so are less likely to be consistent when applied in opposite directions in the frame pair. The technique therefore eliminates a large proportion of such erroneous tracks.

Thus, the OpticalFlow class 50 is operable to select test points in the current image based upon correspondence with the points in the preceding image that themselves correspond to the points originally selected in the current image, and discard pairs of points whose test points do not to substantially coincide with the originally selected points in the current image.

Secondly, referring in addition to FIG. 11, difference imaging is a technique that provides dual advantages. Its main purpose is to speed up the matching process by culling points which have not moved before any attempt is made to match them, but has the secondary benefit of culling some points which have been erroneously matched prior to doing a reverse match.

A difference image as shown in FIG. 11 was generated for the image pair as described previously by the DifferenceMetric class 30, and points in the image are culled or kept as follows:

i. A point from the current image that is in the black (stationary) part of the difference image is immediately culled.

ii A point from the current image that is in the white (moving) part of the difference image is tracked to the previous image. If the point in the previous image is in the black part of the difference image, the point pair is culled.

iii. On the other hand, if the point in the previous image is also in the white part of the difference image, then reverse matching is applied to check the validity of the point pair.

Thus, the OpticalFlow class 50 is operable to discard, prior to any selection of points in a preceding image, points in the current image for which the equivalent position in the difference image shows a difference below a calculated difference threshold level.

Alternatively or in addition, the OpticalFlow class 50 is thus also operable to discard, prior to any selection of test points in the current image based upon correspondence with the points in the preceding image, points in the preceding image for which the equivalent position in the difference image shows a difference below a calculated threshold level.

As noted previously, the DifferenceMetric class 30 applies a variable threshold to decide if a point has moved or not. This means that if quite big motions are expected in the image, this threshold can be raised (by the user or automatically having regard to the current game context), making the system less sensitive to subtle movements but also culling more of the erroneous results than reverse matching would achieve on its own.

Computing the difference image and the status of points with reference to this image this is very fast compared to doing the point matching and reverse matching, and hence saves considerable computing resources as well as improving overall tracking accuracy.

Optionally, given knowledge of the image frame rate and a typical speed of user movement, either assumed or calculated over time, then in addition points outside a region surrounding the UI control could be automatically culled, the region surrounding the UI control corresponding to the distance a typical movement would cover in one, two or however many frames are desired. This allows the detection of moving points for tracking into the UI control whilst ignoring genuine but irrelevant motion elsewhere in the image.

Thirdly, the use of multi-frame moving point analysis addresses the third problem outlined above, to differentiate stationary points showing noise jitter from genuinely moving points.

Figures 12A, 12B:
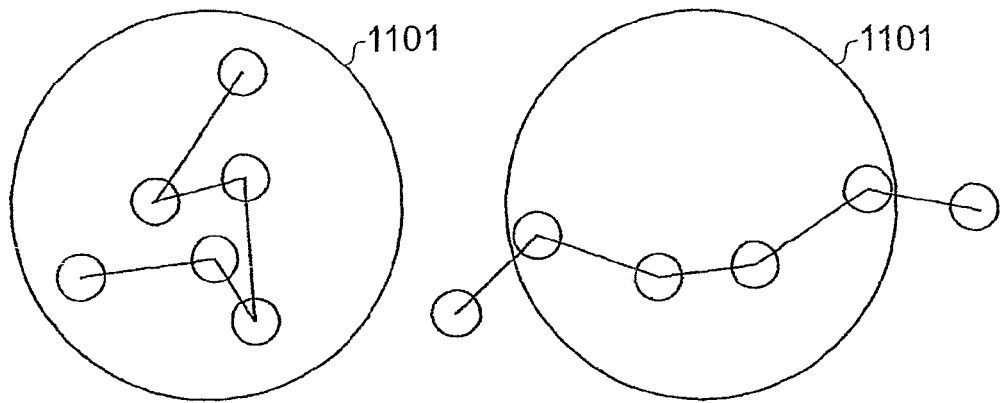
FIGS. 12A and 12B illustrate a means to distinguish types of motion.

Referring to FIGS. 12A and 12B, it can be seen that the random nature of noise jitter means that the motion of the stationary point does not acquire an overall direction. Thus, a point which is moving will eventually move far enough from its original position so that it can be measured, while by contrast a point just moving randomly will tend to stay in the same place.

To distinguish these two outcomes, typically a large number of images in the ImageHistory class 20 are considered (at least three, and typically ten to twenty). Firstly, tracking points found in the current image are located in the previous image as normal. However, each of those positions in the previous image are then taken as points to track and are found in the image before that, and so on. Depending on how fast the frame-rate is and how slow the motion is expected to be, the points can be tracked back as far as necessary, subject to any memory constraints in the ImageHistory class 20, or any constraints on processing time (as this increases linearly with each additional frame).

The point history can then be analysed to determine whether any point has moved further than some threshold (e.g. a threshold denoted by circle 1101) during the last R frames and is therefore a moving point rather than a stationary one. Typically, R is empirically determined or is a function of the video capture frame rate. To reduce computational load, optionally once a point has been determined as a moving point (i.e. it has exceeded the threshold inter-image motion over the relevant number of images), it need no longer be tracked back through further frames.

The threshold for the amount of movement expected by a genuinely moving pixel will of course vary with the number R and the video frame rate. The threshold will generally be higher for a higher value of R and will generally be higher for a lower frame rate.

Thus, the OpticalFlow class 50 is operable to recursively obtain pairs of points for detecting motion for previous images stored in the ImageHistory class 20, and the cumulative net motion of these pairs of points is compared to a distance threshold, to distinguish intentional motion from image noise.

An additional advantage of this technique is that it also picks out points which were previously moving but have now stopped, as being distinct from points which have never moved. Optionally these points may, for example, be excluded from culling under the difference imaging technique if stationary for less than a predetermined number of frames prior to the current frame.

Optionally the technique allows the moving and stationary points to be drawn differently on the display 305 and, for the moving ones, show the path they have followed. This could, for example, give a user useful feedback as to how the control works whilst in a tutorial mode, so they can learn more quickly how to use it.

Because the tracking methods described above preferably use the difference imaging technique to cull erroneous point pairs and to reduce computation, the DifferenceHistory class 40 stores difference images corresponding to the images in the Image history class 20.

Notably, a point which starts in the black area of the cumulative difference image is guaranteed not to be moving at any point in the last J images. As such, if using the difference images solution, then optionally black points in the cumulative difference can be excluded from multi-frame moving point analysis as it is known that they will be stationary over the whole image history. Thus the cumulative difference data is used, prior to obtaining pairs of points recursively from previous images in the image history, to discard those points where no difference between successive images has been sufficient to exceed a calculated difference threshold level.

The PointHistory class 60 holds the location over the last J images of points which have been identified as being good to track, (i.e. storing points determined to have shown intentional motion at some time). At least some of these points are then used to analyse the user's interaction with the UI control or controls, as described below.

The MotionModel class 70 is a class comprising functions for modelling the motion of a rigid body. In the general case, a set of before and after point-pairs are taken and a motion which best maps the before-points to the after-points is calculated. Typically the output from the motion model will be four values: X translation, Y translation, Scale and Rotation about some origin.

In an embodiment of the present invention, the point pair is taken from the current and preceding image. In an alternative embodiment, point pairs from additional older images may be used to generate a smoother motion model, but the historical data may generate the appearance of lag in the UI control response, dependent upon the number of images used and the camera frame rate.

There are a number of ways this can be modelled, but in general, a set of equations are used that describe the model and map the points from before to after. The equations contain a number of unknowns which describe the amount of rotation, translation and scale. A least-squared-error equation solving technique is then used on the point-pairs to estimate these unknowns, given the observed points.

In an embodiment of the present invention, the equation solving method is called the Householder Orthogonalization least squares method, described for example in Gene H. Golub and Charles F Van loan "Matrix Computations", third edition (ISBN: 0801854148).

The MotionModel class 70 comprises a number of motion models (or subclasses), described below.

The RotScaleTransModel function assumes that the body can rotate, scale and translate in the X or Y directions. The position of the origin that these motions are measured relative to must be supplied.

Before the main calculation, the origin position is subtracted from each of the point positions.

Suppose that the points' modified current and previous positions are given as follows:
  $xCurrent_k$ is the current x coordinate of the $k^{th}$ point
  $yCurrent_k$ is the current y coordinate of the $k^{th}$ point
  $xPrev_k$ is the previous x coordinate of the $k^{th}$ point
  $yPrev_k$ is the previous y coordinate of the $k^{th}$ point
From a collection of these points, the following unknowns need to be estimated:
  scale: The amount the body has increased in size;
  $\theta$: The angle it has turned through;
  transX: The X component of the translation, and;
  transY: The Y component of the translation
In this model, the equations describing how the current point is derived from the previous point is given as follows:

$$xCurrent_k = xPrev_k.scale.\cos\theta - yPrev_k.scale.\sin\theta + transX$$

$$yCurrent_k = xPrev_k.scale.\sin\theta + yPrev_k.scale.\cos\theta + transY$$

Every point pair gives two such equations. The aim is then to find a scale, $\theta$, transX and transY that minimises the error in this collection of equations.

The equations are reformulated as a matrix/vector equation:

$$\begin{pmatrix} xPrev_0 & -yPrev_0 & 1 & 0 \\ yPrev_0 & xPrev_0 & 0 & 1 \\ xPrev_1 & -yPrev_1 & 1 & 0 \\ yPrev_1 & xPrev_1 & 0 & 1 \\ \cdots \\ \cdots \\ xPrev_n & -yPrev_n & 1 & 0 \\ yPrev_n & xPrev_n & 0 & 1 \end{pmatrix} \cdot \begin{pmatrix} scale.\cos\theta \\ scale.\sin\theta \\ transX \\ transY \end{pmatrix} = \begin{pmatrix} xCurrent_0 \\ yCurrent_0 \\ xCurrent_1 \\ yCurrent_1 \\ \cdots \\ \cdots \\ xCurrent_n \\ yCurrent_n \end{pmatrix}$$

For n points, the matrix will have 2n rows. The Householder Orthogonalization algorithm is then used to find the least error solution (M, N, P and Q) to this matrix equation, where M=scale.sin θ, N=scale.cos θ, P=transX and Q=transY.

Once values for M, N, P and Q are obtained in this way, the values for scale, θ, transX and transY are calculated as follows. From the point pair equations disclosed previously, observe that:

$$M^2+N^2=\text{scale}^2.\sin^2\theta+\text{scale}^2.\cos^2\theta.$$

This implies that $M^2+N^2=\text{scale}^2.(\sin^2\theta+\cos^2\theta)$.

Now, $\sin^2\theta+\cos^2\theta=1$ for all values of θ. Therefore $M^2+N^2=\text{scale}2$.

So, scale=$\sqrt{M^2+N^2}$, which when substituted into the second point-pair equation gives:

$$\theta = \cos^{-1}\left(\frac{N}{\sqrt{M^2+N^2}}\right),$$

whilst
transX=P, and
transY=Q.

The RotScaleModel function works in a similar way to the RotScaleTransModel, and assumes that the body is fixed at a pivot point. It can scale and rotate about this point, but the translation values are always zero.

Consequently the point-pair equations are slightly different to those given previously:

$$x\text{Current}_k = x\text{Prev}_k.\text{scale}.\cos\theta - y\text{Prev}_k.\text{scale}.\sin\theta$$

$$y\text{Current}_k = x\text{Prev}_k.\text{scale}.\sin\theta + y\text{Prev}_k.\text{scale}.\cos\theta$$

Again the equations are reformulated as a matrix/vector equation $$\begin{pmatrix} x\text{Prev}_0 & -y\text{Prev}_0 \\ y\text{Prev}_0 & x\text{Prev}_0 \\ x\text{Prev}_1 & -y\text{Prev}_1 \\ y\text{Prev}_1 & x\text{Prev}_1 \\ \ldots & \\ & \ldots \\ \ldots & \\ x\text{Prev}_n & -y\text{Prev}_n \\ y\text{Prev}_n & x\text{Prev}_n \end{pmatrix} \cdot \begin{pmatrix} \text{scale}.\cos\theta \\ \text{scale}.\sin\theta \end{pmatrix} = \begin{pmatrix} x\text{Current}_0 \\ y\text{Current}_0 \\ x\text{Current}_1 \\ y\text{Current}_1 \\ \ldots \\ \ldots \\ \\ x\text{Current}_n \\ y\text{Current}_n \end{pmatrix}$$

and are solved as before to get scale and θ.

Alternatively or in addition for the RotScaleTransModel and RotScaleModel functions, points in an image can be joined as lines, or alternatively edge detection can be performed for edges intersecting these points (for example, around the fingers). The resulting lines can be used to determine changes relative angle by use of the so-called Radon transform, which gives a peak response (or distribution) when the angle of projection of the transform coincides with an angle (or angles) of the lines in the image. This technique can be used to provide rotation data.

Likewise, from one frame to the next, the size of the physical object represented by a Line can be assumed to be fixed. Thus by measuring the lines along the angle of projection of the Radon transform, change in scale and hence distance can be determined.

The TransModel function assumes that a body can simply move but cannot rotate or scale. This model therefore take the average motion of all the points and sets transX and transY accordingly:

$$\text{transX} = \frac{1}{N}\sum (x\text{Current}_k - x\text{Prev}_k)$$

$$\text{transY} = \frac{1}{N}\sum (y\text{Current}_k - y\text{Prev}_k).$$

The MotionConstraints class 80 comprises functions to model a number of constraints. Given the motion models disclosed previously, it is possible to determine, inter alia, the following properties for a notional body:

Position, Orientation, Scale, Velocity, Angular Velocity, and Scaling Velocity.

A constraint function takes the values of these properties and modifies them to conform to some constraint. It is possible for such a body to have several constraints acting on it at once.

Several examples of possible constraint functions are described below.

The LinearConstraint function fixes the position of the body to lie along a straight line. Also the velocity is replaced by the component of the velocity in the direction of this line.

The RangeConstraint function sets upper and lower limits on any of the body properties. This could be used for example to:

Make a scroll bar of a finite length.
Make a dial only turn half way round.
Fix translational motion to zero (so the body pivots around its position).
Ensure the body stays within some maximum speed.

It should be noted that using a restraint to fix the translation to 0 and using the RotScaleTransModel function is not equivalent to using the RotScaleModel function with no restraints. In the former the translation is modelled and then thrown away. In the latter, the model is directed solely to modelling rotation and scale (with any translation present interpreted as best it can by the RotScaleModel function).

The UIControl class 90 co-ordinates between the PointHistory class 60, the MotionModel class 70 and the MotionConstraints class 80, and can manage data for the Position, Orientation, Scale, Velocity, Angular velocity, Scale velocity (rate of change of scale) and Shape (circle, strip, square etc., which remains constant) of a UI control.

The UIControl class 90 examines the PointHistory class 60 and only considers points which are currently moving. It then excludes any whose current position is outside of the shape of the UIControl (for example, outside border 1015 in FIG. 4).

If there are enough such points, it takes just the current and previous positions of the moving points in the PointHistory class 60 and passes them to the MotionModel class 70 to get the transformation for this frame pair.

The velocity, angular velocity and scale velocity of the UI control are set to correspond to the transformation for this frame. These properties (as well as the position, orientation and scale) are passed to any constraints in the MotionConstraints class 80 that may exist for this control for modification. These modified properties are then made available to act as a user input.

Optionally, an error value can be calculated for these modified properties. This is calculated by transforming all the points in the last frame using the modified velocity, angular velocity and scale velocity and looking at the difference between where they end up and where they were observed to be in the current frame. This difference is then scaled so the error is a proportion of the total distance for each of the points that have moved. The log of this value is taken, and a sum all of the errors from all the points is divided by the number of points. This gives an error value which is independent of the size of the motion and of how many points were observed, and gives a good indication of how well the user's motion remained within the constraints. Such an indication can be used, for example, to give the user feedback; for instance if they are trying to move a scroll control too quickly, it may glow red.

Optionally, the error value can be used to control the locking of a UI control according to whether the movement detected has a low error and thus conforms closely to the motion constraints of that UI control. For example, this would enable a dial control to remain locked when a person walks 'through' it, as there is a very low rotational component compared to the transitional component of the motion, resulting in a high error. Conversely, valid movement that unlocked the dial control could be obtained by a person using two hands instead of one, if they turned their hands in concert as if operating a steering wheel.

If there are not enough moving points in the control to interpret as a user interaction (for example as the user's hand leaves the UIControl boundary), then there three choices; either the velocity (direct, angular and/or scalar as appropriate) can be kept the same thus modelling momentum, or it can be slowly decreased (modelling friction) or set to zero (modelling a light but stiff control).

Configurations of the UIControl class 90 operation specific to the example UI controls given above are now detailed.

Referring again to FIG. 5, the scrolling control is implemented using the TransModelMotion function, and uses the LinearConstraint function to constrain the motion to (in this case) a vertical line. It can also, optionally, restrict the range along that line (if a finite length scroll control is desired). If not enough moving points are found, the velocity is left to decrease slowly to model a scroll bar with momentum and some friction.

The scrolling control also uses the difference imaging technique disclosed previously to improve the efficiency of the optical flow calculations. As quite large and fast motions of the user can be expected, the difference imaging threshold can be raised appropriately. The difference imaging technique is particularly beneficial for this UI control as it is comparatively large and can therefore be expected to contain proportionately more extraneous points.

Referring again to FIG. 4, the dial control is implemented using the RotScaleTrans function, and uses the RangeConstraint function to constrain it to have zero velocity and zero scale velocity. It also uses the error value calculated from the motion to determine whether the user has preformed a good rotational movement. If they have not, the dial control locks. Similarly, if there are not enough moving points, the dial control locks.

Optionally, the dial control does not use the difference buffer to streamline the OpticalFlow case 50 functions. The reason for this is that the difference buffer may not be sensitive enough to pick up some of the very slow subtle motions that can occur when operating the dial control (dependant upon noise calibration, as disclosed later). However, as the area of the dial control is considerably smaller than the scrolling control, the impact on computational load is similarly small.

The wheel control is implemented in similar fashion to the dial control, but does not impose any locks, allowing any calculated motion within the wheel to be interpreted as rotational motion, and for the wheel to continue spinning (or slow down) if not enough moving points are found within the wheel.

Other variations on the dial control include a scale dial, which exploits that the RotScaleTrans function can interpret the translation of moving points away from the origin of the dial as indicative of the scale to which the dial should be displayed. Therefore unlike the dial control above, the RangeConstraint function does not constrain scalar velocity but instead constrains the dial to have zero velocity and zero angular velocity. The scale dial therefore expands and contracts as the user opens and closes their hand. Typically the scale dial locks in a similar fashion to the normal dial control.

If the constraint to zero angular velocity is also removed, then the dial can be turned and scaled simultaneously. Thus, for example, the scale could relate to the volume of sound played by a games machine, whilst the rotation could relate to the stereo balance.

The RangeConstraint function can limit the maximum and/or minimum scale, for example to prevent the scale dial becoming too small to clearly see or to contain sufficient points for motion analysis; a scale wheel can similarly be implemented.

Other combinations of control using the above motions and constraints will be apparent to a person skilled in the art, as will other UI form factors, such as a bar whose length is dependent upon point translation in a similar fashion to the scale dial.

Similarly, other modes of interaction may not display a graphical control; for example, the RotScaleTransModel and RotScaleModel can interpret the change in scale of a fist punched toward the video camera to act as input in a boxing game; in this scenario, the whole image is a 'transparent' control area, and the user's motion within it is interpreted appropriately.

The type of interaction can be indicated by the cosmetic appearance of the control. For example, a dial control could be illustrated by a dial as expected, naturally inviting the user to adjust the dial with a single hand. By contrast, the dial could be represented by a steering wheel, inviting a two-handed approach. The graphics of the dial may resemble line drawings or pictorial images, with or without areas of transparency. When interacting with the graphic, moving areas in the captured image coinciding with the graphic may be overlaid or alpha-blended to allow the user better feedback of their actions.

It will similarly be appreciated that a UI control may activate, change or acquire a behaviour according to context; for example, the scrolling control could display a number of icons including a number of dials; when one of these is scrolled into an 'active' area, it is seamlessly replaced by an actual dial control (or variant) using the same graphic. The user experience is that the scrolling control houses a number of selectable dial controls. In another example, the UI control may only be translatable when scrolled into an active area, allowing 'favourite' or 'shortcut' controls to be selected and pulled out of a scroll bar to reside on the screen.

Figure 13:
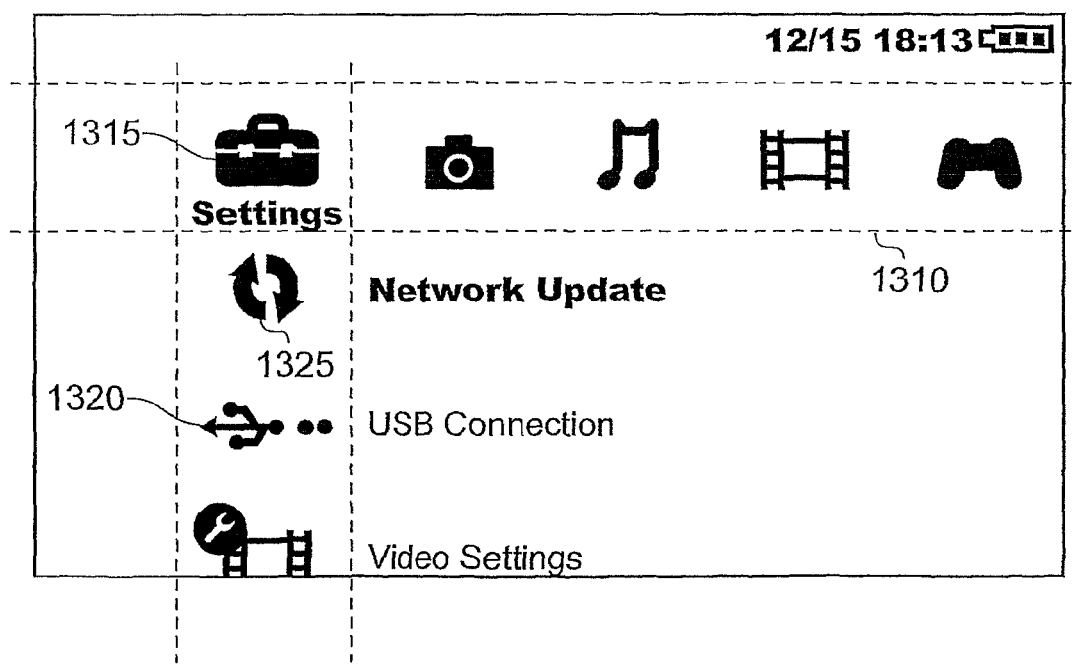
FIG. 13 illustrates the application of a user control detection mechanism to the navigation system of a Sony® PSP® games machine.

FIG. 13 illustrates an embodiment of the present invention for a Sony® PlayStation Portable® video game device (PSP) to which a video camera has been attached or otherwise connected. The 'cross-media bar' navigation system used by the PSP is illustrated, and comprises a horizontal row 1310 of category icons, of which one representing Settings 1315 is situated in an active area, causing a vertical row 1320 of sub-categories related to settings to be displayed. Of these sub-categories, Network Updating is currently highlighted.

It will be appreciated that the horizontal row of category icons can be controlled using the scrolling control as disclosed above, and that when a vertical row of sub-categories relating to one of the category icons is displayed, this can similarly be controlled using a scrolling control, the difference between them being in the horizontal and vertical translation constraints applied to the motion models. Similarly values or properties of the highlighted category could then be altered, for example using a dial control as disclosed above, turning left or right for on or off, or to set a continuous value, where applicable.

Interaction between these controls can be managed by the use of activation, changing (e.g. locking and unlocking) or acquiring behaviours as appropriate to obtain the desired result. For example, when either the vertical scrolling control or a dial control has been used, the horizontal scrolling control can be locked until horizontal motion is detected in the active area occupied by the current category icon. This would prevent inadvertent head movement from changing categories while the user is adjusting settings in subcategories, for example, and gives the user the experience that the horizontal scroll bar locks when other controls are being adjusted, until specifically reactivated by the user. In an alternative interaction scheme, the horizontal scroll control only locks when another UI control detects motion, so that the horizontal scroll control has the lowest priority of response. The vertical scroll control could have the next level of priority, and a dial control for the currently highlighted sub-category could have highest priority.

Figure 14:
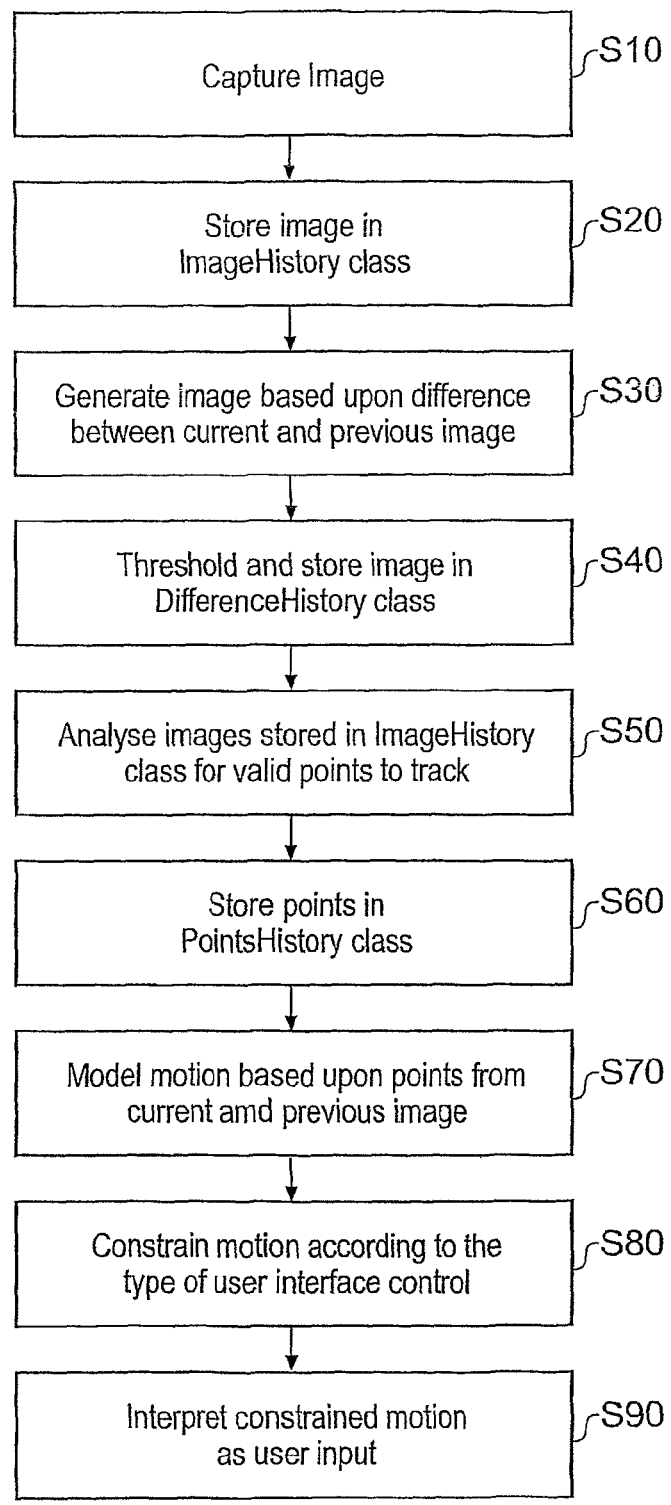
FIG. 14 is a flow chart illustrating a method of user control detection.

Referring now to FIG. 14, a method of user control detection comprises the steps of:

S10 Capturing an image;
S20 Storing the image in an ImageHistory class 20;
S30 Generating a image according to the difference between the current and previous image;
S40 Storing a thresholded version of the difference image in a DifferenceHistory class 40;
S50 Analysing images stored in the ImageHistory class 20 to find valid points to track from one image to the next;
S60 Storing these points in a PointsHistory class 60;
S70 Modelling the motion of selected points in the current and previous frames;
S80 Applying motion constraints suitable to the UI control;
S90 Interpreting the constrained motion as a user input.

It will be appreciated that further embodiments of the above method that correspond to the operation of embodiments of user control detection mechanism disclosed herein are also envisaged within the scope of the invention.

Figure 15:
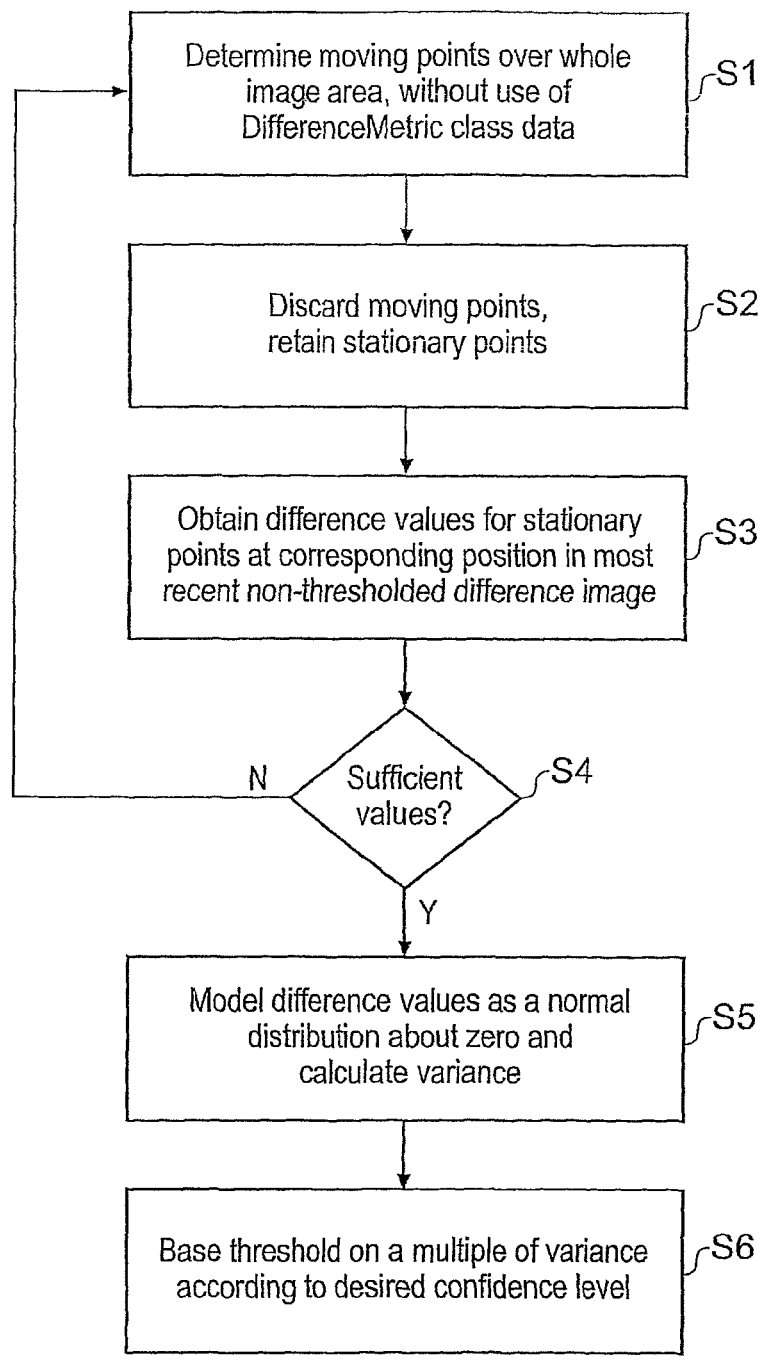
FIG. 15 is a flow chart illustrating a method of noise calibration.

FIG. 15 is a flow diagram illustrating a noise calibration method. As disclosed previously, it is necessary to set a threshold in the DifferenceMetric class 30 in order to turn an input greyscale image into a binary image. A noise calibration method is designed to find such a threshold so that preferably it is as low as possible whilst effectively screening noise from the camera image. Preferably this should be achievable without the user having to step out of the scene in order to sample the background noise.

The method uses the functions of the OpticalFlow class 50 to calibrate the DifferenceMetric class 30. This ensures that there is a good correspondence between what the OpticalFlow class 50 regards as motion and what the DifferenceMetric class 30 regards as motion.

The method comprises the following steps:

S1. Perform an OpticalFlow class 50 calculation over the last J frames over the whole image area to determine moving points. The DifferenceMetric class 30 is not used to assist this calculation.

S2. Identify all the moving points from the PointHistory 60 and discard them.

S3. For each remaining stationary point look at the most recent non-thresholded difference image at that position and record its value. This gives a set of difference values from points in the image which are stationary.

S4. Repeat steps 1 to 3 over several frames to obtain sufficient values to be statistically significant.

S5. Model these stationary difference values as a normal distribution around zero and calculate the variance.

S6. Multiply this variance by some suitable value (for example 3) and use it as the basis for the difference metric threshold. A value of 3 signifies a 99.7% confidence that a stationary point will not trigger the threshold.

In an alternative embodiment, the noise is calibrated by generating a histogram of difference values for each pixel over a number of successive frames. This exploits the fact that the camera noise will always be present and at a similar level, and so can be expected to form a peak in the histogram, whereas real motion in the image will be random and have a broad distribution of difference values. Consequently, the first clear peak encountered in the histogram, when traversed from smallest to largest difference values, can be taken as the mean noise value above which to set the threshold.

Whilst calibrating the noise by either embodiment, it is preferable for the illumination of the scene to be uniform. Consequently in a preferred embodiment, the brightness and colour output by the TV display should not fluctuate significantly during calibration. The primary purpose is to avoid apparent motion due to rapid variation in shadows due to rapid changes is illumination of the environment by the TV screen. By contrast, during normal play the methods described herein advantageously provide robustness to apparent motion due to changes in illumination from the TV or other environmental factors by their evaluation of the candidate points for tracking in each image.

Optionally, noise reduction methods may be used to suppress random camera noise and so better distinguish intentional movement. The randomness of the camera noise means that averaging in space or time will reduce the effective noise level. However, averaging in time (over successive images) will reduce sensitivity to slow but genuine movements, whilst averaging in space (over an n×n pixel area for each pixel) will reduce sensitivity to small but genuine movements. Thus the applicability of these techniques depends on the frame rate or the resolution of the video camera respectively, and on the types of controls with which the user is expected to interact. It will be appreciated that the averaging can be applied at any point prior to difference thresholding. Although the best results are obtained from the original image, this requires three averages (for red) green and blue values) compared to a single average for the greyscale difference image, and thus their comparative value in terms of quality and computational load may depend upon the application.

In so far as the embodiments of the invention described above are implemented, at least in part, using software-controlled data processing apparatus, it will be appreciated that a computer program providing such software control and a storage or transmission medium by which such a computer program is stored are envisaged as aspects of the present invention.

The invention claimed is:

1. Data processing apparatus arranged to receive successive images from a video camera, the apparatus comprising:
    means for detecting inter-image motion for selected points in an image region associated with a control function of the data processing apparatus; and means for executing the control function if inter-image motion is detected in the image region;

in which the detecting means is arranged to:

identify test points in a currently received image which are detected to have a correspondence with respective points in a preceding received image, for each test point, detect whether a point in the current image, which correlates with the point in the preceding image corresponding to that test point, is within a threshold image distance of that test point, select, as a selected point for use by the detecting means, a test point for which the point in the current image, which correlates with the point in the preceding image corresponding to that test point, is within a threshold image distance of that test point, and deselect other test points; and difference measuring means for generating difference data and for subsequently smoothing the difference data, the difference data comprising a set of values proportional to the difference in pixel values between two successive images, in which the difference measuring means is further configured to apply a threshold to the difference data at a difference threshold level, and output resulting binary difference data, and in which the means for detecting inter-image motion is configured to discard, prior to any selection of test points in the current image based upon correspondence with the points in the preceding image, points in the preceding image for which the equivalent position in the difference image shows a difference below the difference threshold level.

2. Apparatus according to claim 1, comprising a video camera for supplying the successive images.

3. Apparatus according to claim 1, comprising:

a video display;

means for displaying, on the video display, a movable user control;

in which the control function comprises at least moving the moveable user control.

4. Apparatus according to claim 3, in which the moveable user control is moved by an amount dependent upon the degree of inter-image motion detected by the detecting means.

5. Apparatus according to claim 1, comprising difference data storage means operable to combine the binary difference data for a sequence of images to generate a cumulative binary difference image indicating all points over a sequence of images that have shown a difference between successive images that has exceeded a difference threshold.

6. Apparatus according to claim 1, comprising means for processing image data received from the video camera by applying one or both of the following processes:

i. spatial averaging, and ii. temporal averaging.

7. Apparatus according to claim 1, in which the difference measuring means is operable to calculate a difference threshold between successive images, based upon the variance in the difference values of selected points that are found to be stationary.

8. Apparatus according to claim 1, in which the difference measuring means is operable to calculate a difference threshold between successive images, the calculation being based upon a histogram of difference values for pixels in two or more successive images, and identifying the first histogram peak encountered from the low difference value end of the histogram as the mean camera noise value above which the difference threshold is set.

9. Apparatus according to claim 1, in which the difference measuring means is operable recursively to obtain pairs of points for detecting motion for n previous images stored in an image history store, and to compare the cumulative net motion of these pairs of points to a distance threshold, to distinguish intentional motion from image noise.

10. Apparatus according to claim 9 in which n is three or more.

11. Apparatus according to claim 9, in which the means for detecting inter-image motion is operable to use a cumulative difference image to discard those points where no difference between successive images sufficient to exceed a difference threshold level has occurred, prior to obtaining pairs of points recursively from previous images in the image history.

12. Apparatus according to claim 9, comprising a points history storage means for storing points detected to have shown intentional motion.

13. Apparatus according to claim 12 comprising means for graphically displaying data derived from the points history, to provide information on detected motion to a user.

14. Apparatus according to claim 9, comprising motion modelling means operable to determine changes to any or all of:

i. translation; ii. rotation; and iii. scale; in pairs of points for the current and preceding image that have been determined to show intentional motion.

15. Apparatus according to claim 14 in which point pairs for some or all stored images older than the current and preceding image are used by the motion modelling means.

16. Apparatus according to claim 14 comprising motion constraint means operable to constrain the modelled motion to conform to a desired behaviour.

17. Apparatus according to claim 16 in which deviation by the user from the constrained modelled motion is evaluated, and the user interface control is locked if the deviation exceeds a threshold.

18. Apparatus according to claim 14 comprising display means to update at least a first display item according to the modelled motion.

19. Apparatus according to claim 18 in which the or each display item represents a user interface control.

20. Apparatus according to claim 19 in which the user interface control is any one of:

i. a wheel control;

ii. a dial control;

iii. a scrolling control; and iv. a scale control.

21. Apparatus according to claim 20 in which the wheel control and the dial control are scalable.

22. Apparatus according to claim 14 in which the modelled motion is interpreted as a user input to the apparatus.

23. Apparatus according to claim 1 in which the data processing apparatus is a games machine.

24. A non-transitory computer-readable recording medium recorded with computer software having program code, the program code, when executed by a computer, causes the computer to operate as a data processing apparatus according to claim 1.

25. A data processing method comprising the steps of:

receiving successive captured images from a video camera;

detecting inter-image motion for selected points in an image region associated with a control function of the data processing apparatus; and executing the control function if inter-image motion is detected in the image region;

in which the detecting step comprises:

identifying test points in a currently received image which are detected to have a correspondence with respective points in a preceding received image, for each test point, detecting whether a point in the current image, which correlates with the point in the preceding image corresponding to that test point, is within a threshold image distance of that test point, selecting, as a selected point for use by the detecting means, a test point for which the point in the current image, which correlates with the point in the preceding image corresponding to that test point, is within a threshold image distance of that test point, and deselecting other test points;

generating difference data and for subsequently smoothing the difference data, the difference data comprising a set of values proportional to the difference in pixel values between two successive images, applying a threshold to the difference data at a difference threshold level, and outputting resulting binary difference data, and discarding, prior to any selection of test points in the current image based upon correspondence with the points in the preceding image, points in the preceding image for which the equivalent position in the difference image shows a difference below the difference threshold level.

26. A non-transitory computer-readable recording medium recorded with computer software having program code, the program code, when executed by a computer, cause the computer to carry out a method according to claim 25.

27. A data processing apparatus arranged to receive successive images from a video camera, the apparatus comprising one or more processing devices configured to:

detect inter-image motion for selected points in an image region associated with a control function of the data processing apparatus;

execute the control function if inter-image motion is detected in the image region;

identify test points in a currently received image which are detected to have a correspondence with respective points in a preceding received image;

for each test point, detect whether a point in the current image, which correlates with the point in the preceding image corresponding to that test point, is within a threshold image distance of that test point;

select, as a selected point for use by the detecting means, a test point for which the point in the current image, which correlates with the point in the preceding image corresponding to that test point, is within a threshold image distance of that test point;

deselect other test points;

generate difference data and subsequently smooth the difference data, the difference data comprising a set of values proportional to the difference in pixel values between two successive images;

apply a threshold to the difference data at a difference threshold level, and outputting resulting binary difference data; and discard, prior to any selection of test points in the current image based upon correspondence with the points in the preceding image, points in the preceding image for which the equivalent position in the difference image shows a difference below the difference threshold level.

* * * * *